Sept. 2, 1952          G. O. GRAAFF          2,608,815
MACHINE FOR HANDLING SUGAR BEETS, POTATOES, AND THE LIKE
Filed Nov. 29, 1948          2 SHEETS—SHEET 1

GERALD O. GRAAFF
Inventor

Smith + Tuck
Attorneys

Sept. 2, 1952 G. O. GRAAFF 2,608,815
MACHINE FOR HANDLING SUGAR BEETS, POTATOES, AND THE LIKE
Filed Nov. 29, 1948 2 SHEETS—SHEET 2
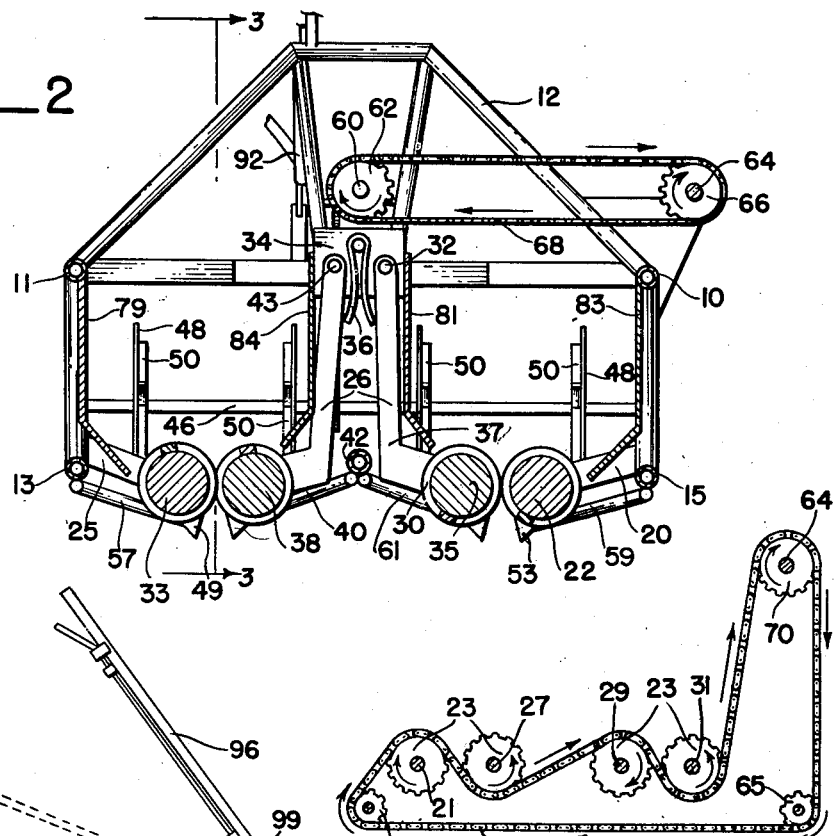
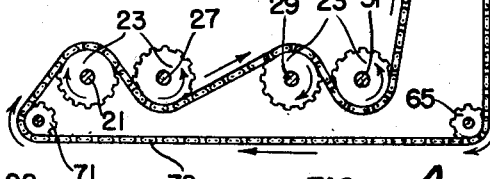
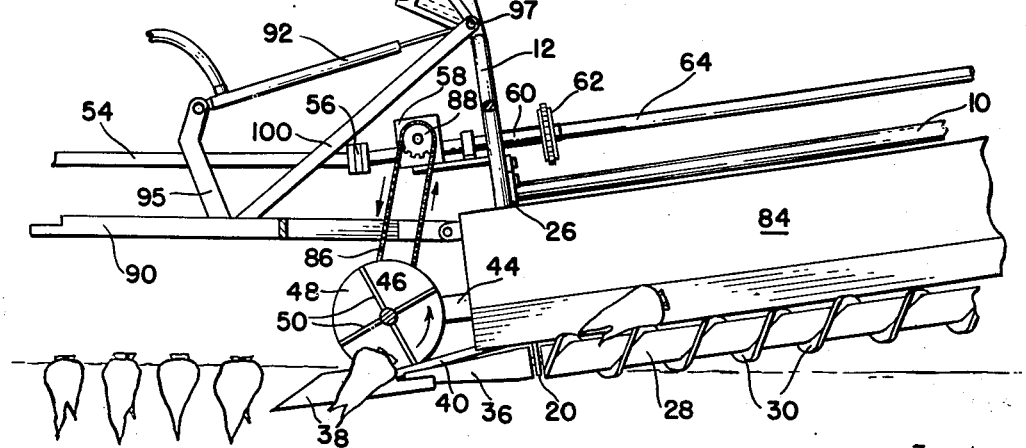
Inventor
GERALD O. GRAAFF
By Smith + Tuck
Attorneys Patented Sept. 2, 1952

2,608,815

UNITED STATES PATENT OFFICE 2,608,815

MACHINE FOR HANDLING SUGAR BEETS, POTATOES, AND THE LIKE

Gerald O. Graaff, Ellensburg, Wash.

Application November 29, 1948, Serial No. 62,517

3 Claims. (Cl. 55—106)

This invention relates to a machine for handling sugar beets, potatoes and the like, and, more particularly, is concerned with conveying, cleaning and screening such objects, in the field as a movable operator or as a stationary machine where digging may have been separately done.

Since this machine is peculiarly adapted to solve many problems arising in connection with the harvesting of sugar beets, I shall confine the exemplifying portion of this specification to that particular type of vegetable. It is, however, to be understood that this invention is adaptable to use in connection with potatoes, carrots and other similar below ground-level growing vegetation and that I do not intend to unduly limit my invention to its application in sugar beet processing.

Sugar beets are a form of vegetation that is particularly difficult to harvest for the reason that they grow large, have a rather abrupt conical shape, are well rooted in the ground, and usually come from the ground with considerable quantities of hair-roots and substantial amounts of earth in lumps or gobs. Because of the problems of withdrawing the beets from the ground, it is common to harvest them when the soil is fairly damp and gummy because they are easier to lift than when a dry condition prevails. This means that the beets are particularly dirty and must be cleaned before ultimate marketing in order for the producer to gain the best sales prices.

Ordinarily, the sugar beets are topped flush with the ground before they are pulled or dug in order to remove the leaves above the ground. Thus, the digging operation is performed at and below ground-level by mechanism which penetrates the earth. To convey the beets from the digging means and to screen them, it is necessary to employ mechanism that is above the earth. This implies that the beets must be raised to a point at least a foot or so over ground level and delivered to an elevator for further elevation and delivery of the beets into trucks. The screening operation must accommodate stones and clods of earth, as well as stray bits and pieces of vegetation that might move with the beets, and the whole operation must be carried on continuously and efficiently and fairly rapidly.

It is, therefore, among the important objects of this invention to provide, in a machine for digging, screening, conveying and elevating sugar beets and the like, a mechanism: which will carry on each and all of these functions continuously; which is simple and easy to construct and operate and will have a long and useful life under conditions of hard use; which will accommodate stones and earth clods and undesirable vegetation and separate the same from the sugar beets rapidly and without injury to the beets and the like, or to the machinery employed; which will move the objects dug away from the digging operation and elevate them, while at the same time scouring them to remove hair-roots and earth that may be adhering to the surface; which can be operated by relatively unskilled labor with efficiency and substantial production, and without personal danger; and which can be simply adapted for multiple row operation to expedite harvesting.

These and other objects of the invention will be more apparent during the course of the following description in which is disclosed a preferred form of my mechanism and in which Figure 1 is a plan view of my harvesting machine;

Figure 2 is a vertical sectional view taken on line 2—2 of Figure 1;

Figure 3 is a partial view in elevation taken on the plane 3—3 of Figure 2, showing in enlarged detail certain features of the machine; and Figure 4 is a schematic view of the driving means for the scouring conveying rollers of my machine.

Figure 1:
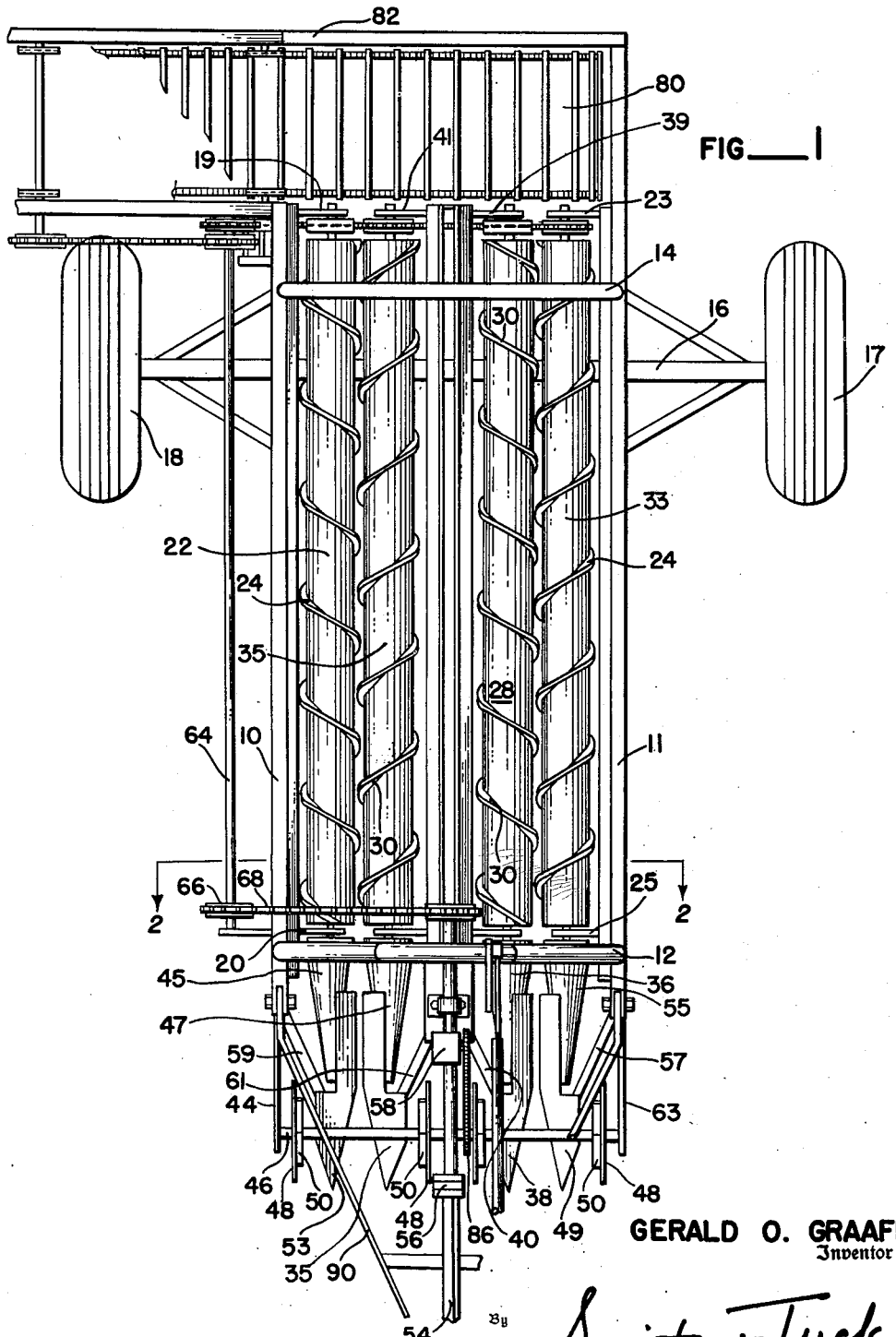

Referring to Figures 1 and 2, my machine is shown to comprise the longitudinal frame members 10, 11, 13 and 15 which are maintained apart by lateral arches 12 and 14. This framework is mounted upon axle 16 that has wheels 17, 18 at each end. Each side pair of members 10, 15 and 11, 13 form a longitudinal beam which support the inwardly directed arms 20, 19, 23, 25 that provide mounts for the shafts 21, 27 of the roller elements 22, 33 that have a thread 24 wrapped therearound in a helical manner.

Medially of the machine and depending from the arches 12 and 14 are mounted arms 26, 37, 39, 41 that support shafts 29, 31 of the inboard rollers 28, 35 that likewise have screw threads 30 therearound. Arms 26, 37, 39, 41 are carried by pivot pins 32, 43 on plate 34 and a heavy hairpin spring 36 interposed between the arms 26, 37 and 39, 41 tends to force the same apart and toward the outboard rollers 22, 33. The forward ends of rollers 22, 33 and 28, 35 have tapered nose sections 36, 55, 45, 47 and plows or digger blades 38, 49, 51, 53 slightly overlie sections 36, 55, 45, 47 and are supported thusly by arms 40, 57, 59, 61 suitably cantilevered from the framework of the machine, including the lower medial member 42 that is part of the frame of the machine.

Forwardly extending arms 44, 63 on each side of the machine form bearings for the cross shaft 46 which carries coulters 48 that roll along the ground slightly outside the diggers 38 and have blades or fins 50 on their inner faces adjacent the diggers.

Each shaft 21, 27, 29, 31 on the rear of the machine has a gear or sprocket 23 by which power is applied to rotate the various shafts and associated rollers.

Power is supplied to the harvester machine from a separate source, such as from a tractor, through drive-shaft 54, flexible coupling 56 in the speed reducer 58 and take-off shaft 60, having sprocket 62 thereon. A counter-shaft 64, having sprocket 66 aligned with sprocket 62, is joined by chain 68 with the parts rotated in the directions indicated by arrows throughout the drawings. At the rear of shaft 64 I provide sprocket 70 which, with idlers 71, 65, form a part of the train of sprockets, including sprockets 23 on the roller shafts 21, 27, 29, 31 which are encircled by chain 72 which is interwoven among sprockets 23 to produce counter-rotation of adjacent pairs of shafts and the rollers, in the manner indicated. It will be seen that the rollers 22, 33 and 28, 35 of each pair are rotated so that their opposed faces are moved downward relative an upright plane therebetween. Due to the fact that the screw thread of each roller is opposite that of the other and are so arranged that they progress from the leading end adjacent the plows to the trailing end, sugar beets or other objects that are delivered to the leading end will be conveyed toward the trailing end. The thread element of each helix is staggered with relation to the adjacent thread element so that rollers are permitted to come fairly close together and the thickness of thread of each roller is materially less than the diameter of the rollers. This provides slots between the rollers through which earth particles and vegetation, such as leaves and tops, can pass downward away from beets that may lie on the rollers. The spacing between the coils of each helix is approximately that of the diameter of the roller, as shown in the drawings.

The numeral 80 designates as a whole a lateral conveyor which receives beets and the like from the screws and moves them to one side and upward in the frame 82, to raise them for dumping into a box on a truck or in a windrow in the field.

Extending upward and outward from the outer sides of the screw rollers are side walls 79, 81, 83, 84 which, in pairs, form trough walls to confine the beets and the like to the rollers and insure that they do not tumble off.

Shaft 46 is rotated by power supplied through chain 86, which extends between sprocket gear 88 on one side of the speed reducer 58, and similar sprocket on shaft 46. This causes the coulters and their fins to rotate alongside the beets that are raised from the ground by diggers 38, 49, 51, 53 as shown in Figure 3. The fins 50 strike such beets as roll against the coulters and urge them rearward onto the conveyor screws. The edges of the coulters tend to shear vegetation alongside the digging operation and prevent excess trash getting onto the rollers.

The function of the rollers and their screw elements is to convey the beets rearward and to elevate them slightly from the ground for deposit on the conveyor 80. The screw elements also scour the side surfaces of the beets and abrade and otherwise remove the hair-roots and clods of earth that tend to cling to the beets. During movement on the rollers, the beets tumble and turn in a manner that insures that all their outer surfaces are subjected to the action of the screw elements.

The harvesting machine is usually drawn behind a tractor, to which it is hitched by the yoke 90. The diggers are raised and lowered relative the earth by the hydraulically expansible link 92. Link 92 is interposed between bracket 95 on yoke 90 and the pivoted arm 96 which carries pin 97. Arm 96 is associated with a notched quadrant 98 and carries latching means 99, permitting manual adjustment of the arm 96. A stiff link 100 is also interposed between yoke 90 and pin 97. By this means, schematically shown for illustration purposes, various adjustments of the diggers can be obtained according to the wishes of the harvester operator.

Having thus described my invention, I claim:

1. In a machine to receive and convey and process sugar beets and the like immediately following their removal from the ground, the construction, comprising: a frame adapted to be moved over the ground; a juxtaposed pair of elongated screw elements mounted in said frame to extend longitudinally of the direction of travel thereof and with their rear ends slightly above the ground surface, the axes of said screw elements lying on a common line in side projection; each said screw element consisting of a cylindrical body having spirally arranged therearound along its length an outstanding rib of materially lesser height than the diameter of the cylinder and having a lead greater than the cylinder diameter; the ribs of said pair of screw elements diverging rearwardly when viewed from above; said pair of screw elements being arranged so that each has an opposite lead to that of the other of the pair; means for counter-rotating said screw elements so that their opposed faces are moved downward relative an upright plane therebetween; and means to dig sugar beets from the ground and to immediately following their removal deliver them upon said screw elements whereby the beets and the like are conveyed rearwardly by the screw elements from the point of delivery and are at the same time scoured and abraded in a manner to remove surface dirt and the like.

2. The structure according to claim 1 in which the screw elements of the pair are positioned in juxtaposition close enough that the rib of each is slightly intermeshed with the spiral rib of the other of the pair.

3. The structure according to claim 1 in which at least one of said screw elements is associated with a resilient mounting means operable to permit slight separation of the screw elements in the event that an object shall become lodged therebetween.

GERALD O. GRAAFF.

REFERENCES CITED

The following references are of record in the file of this patent:

UNITED STATES PATENTS

| Number | Name | Date |
|---|---|---|
| 1,102,272 | Jensen | July 7, 1914 |
| 1,142,049 | Moore | June 8, 1915 |
| 1,160,777 | Small | Nov. 16, 1915 |
| 1,283,641 | Bollinger | Nov. 5, 1918 |
| 1,793,692 | Groves | Feb. 24, 1931 |
| 1,881,470 | Gentry | Oct. 11, 1932 |
| 2,418,575 | Christiansen | Apr. 8, 1947 |

FOREIGN PATENTS

| Number | Country | Date |
|---|---|---|
| 15,971 | Denmark | May 8, 1912 |